United States Patent [19]

Michna et al.

[11] Patent Number: 5,176,718
[45] Date of Patent: Jan. 5, 1993

[54] REACTIVE DYESTUFF PREPARATIONS CONTAINING PYRIDINE DERIVATIVES

[75] Inventors: Martin Michna, Pulheim; Manfred Hoppe, Kuerten; Karl-Josef Herd, Odenthal-Holz; Hermann Henk, Cologne; Frank-Michael Stöhr, Odenthal, all of Fed. Rep. of Germany

[73] Assignee: Bayer Aktiengesellschaft, Leverkusen, Fed. Rep. of Germany

[21] Appl. No.: 713,931

[22] Filed: Jun. 12, 1991

[30] Foreign Application Priority Data

Jun. 19, 1990 [DE] Fed. Rep. of Germany ....... 4019422

[51] Int. Cl.$^5$ .......................... C09B 67/24; D06P 3/66
[52] U.S. Cl. ............................................ 8/524; 8/527; 8/543; 8/549; 8/568; 8/917; 8/918; 8/924
[58] Field of Search ................ 8/527, 543, 549, 568, 8/524

[56] References Cited

U.S. PATENT DOCUMENTS

| | | | |
|---|---|---|---|
| 2,643,250 | 11/1951 | Stallmann et al. | 8/543 |
| 3,642,787 | 2/1972 | Ponzini et al. | 8/543 |
| 4,453,945 | 6/1984 | Miyamoto et al. | 8/543 |
| 4,525,170 | 6/1985 | Balliello | 8/524 |
| 4,664,670 | 5/1987 | Mehl et al. | 8/470 |
| 4,881,942 | 11/1989 | Connor | 8/532 |

FOREIGN PATENT DOCUMENTS 906807  9/1962  United Kingdom.

Primary Examiner—A. Lionel Clingman
Attorney, Agent, or Firm—Sprung Horn Kramer & Woods

[57] ABSTRACT

Preparations of water-soluble reactive dyestuffs containing pyridine derivatives of the formula

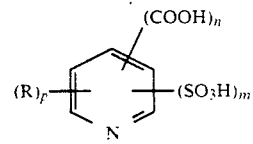

or salts of, in which the substituents have the meanings given in the description, are highly suitable for the dyeing of cellulose materials.

11 Claims, No Drawings

REACTIVE DYESTUFF PREPARATIONS CONTAINING PYRIDINE DERIVATIVES

The present invention relates to preparations of water-soluble reactive dyestuffs, characterised in that they contain pyridine derivatives of the formula

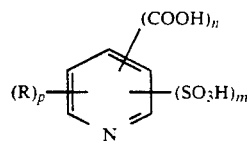

in which
n, m are 0, 1 or 2 and n+m is 1-3
p is 0 or 1
R is $C_1$-$C_4$-alkyl or salts thereof, in particular the alkali metal salts (Li, Na, K).

The alkyl radicals R can be substituted or unsubstituted.

Preferred compounds (I) are: nicotinic acid, isonicotinic acid, pyridine-3-sulphonic acid, pyridine-2,3-dicarboxylic acid, pyridine-2,5-dicarboxylic acid, 2-carboxy-5-methylpyridine, 4-methylpyridine-3-sulphonic acid.

The preparations can be solid or liquid. In general, they contain 0.01-20% by weight, preferably 0.5-10% by weight, of compounds (I).

The solid preparations are present, for example, in the form of powders or granules and in general contain:
10-95, preferably 20-80%, by weight of dyestuff
0.01-20, preferably 0.5-10.0%, by weight of (I)
0-90, preferably 10 to 50%, by weight of conventional standardising agents.

Examples of suitable standardising agents are inorganic salts, such as NaCl, $Na_2SO_4$, $(NH_4)_2SO_4$, polyphosphates, water-soluble organic substances, such as, for example, condensation products of naphthalenesulphonic acid with formaldehyde and dextrin.

Furthermore, the preparations preferably contain buffer substances, in particular those for adjusting the pH to values of about 4 to 8, such as alkali metal phosphates, alkali metal hydrogen phosphate, alkali metal dihydrogen phosphates or alkali metal borates, and conventional dedusting agents, such as oils, phthalic esters, and furthermore nonionic dispersants.

To prepare the solid dyestuff preparations according to the invention, dyestuffs and (I) are preferably mixed and milled in the dry state or the milled components are mixed. The milling can be carried out, for example, in a mixer, a ball mill, a pinned-disc mill, a hammer mill or an air-jet mill.

A different possibility of preparation consists in drying an aqueous solution of dyestuff and (I), followed, if desired, by milling to give a powder. (I) can, if desired, also be added during any desired step of the preparation of the dyestuff.

The liquid preparations can additionally contain water-miscible solvents or solubilizing agents apart from water.

Examples are: open-chain or cyclic amides, such as ε-caprolactam, dimethylformamide, dimethylurea, urea, dicyandiamide. Lactams or lactones, such as N-methylpyrrolidone, γ-butyrolactone, furthermore sulphones, sulphoxides, mono- and polyhydric alcohols, ethers thereof and esters thereof with aliphatic carboxylic acids.

The liquid preparations in general contain:
5-50, preferably 10-30%, by weight of dyestuff
0.01-20, preferably 0.1-10%, by weight of (I)
0-90, preferably 0-60%, by weight of water-miscible solvent
0.1-5% by weight of buffer
20-90% by weight of water.

Reactive dyestuffs are understood to mean those dyestuffs containing at least one fibre-reactive group which under dyeing conditions, if appropriate in the presence of acid-binding agents, are capable of reacting with the hydroxyl groups of cellulose or the NH groups of natural or synthetic polyamide fibres with the formation of covalent bonds.

Suitable dyestuffs are, for example, those which contain at least one reactive substituent bound to a 5- or 6-membered heterocyclic ring, such as a monoazine, diazine, triazine, for example pyridine, pyrimidine, pyridazine, pyrazine, thiazine, oxazine or an asymmetrical or symmetrical triazine ring, or a ring system of this type which has one or more fused-on aromatic rings, such as a quinoline, phthalazine, cinnoline quinazoline, quinoxaline, acridine, phenazine and phenanthridine ring system; the 5- or 6-membered heterocyclic rings, which contain at least one reactive substituent, are therefore preferably those containing one or more nitrogen atoms and 5- or, preferably, 6-membered fused-on carbocyclic rings.

Examples of reactive substituents on the heterocycle are:

Halogen (Cl, Br or F), ammonium, including hydrazinium, sulphonium, sulphonyl, azido($N_3$), thiocyanato, thio, mercapo ether, hydroxy ether, sulphino and sulpho.

Preference is given to dyestuffs having at least one mono- or dihalogeno-sym.-triazinyl radical, mono-, di- or trihalogenopyrimidinyl radical or a -$SO_2CH_2CH_2X$ radical where X is a radical which can be eliminated as an anion, in particular -Cl or -$OSO_3H$.

Particular preference is given to dyestuffs having at least one reactive radical

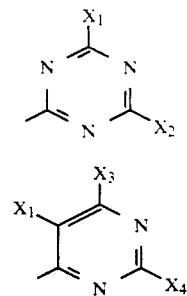

or -$SO_2$-$CH_2$-$CH_2$-$OSO_3H$ where
$X_1$ is Cl, F
$X_2$ is Cl, F, $NH_2$, NHR', OR', $CH_2R'$, SR', NR'R''
$X_3$ is Cl, F, $CH_3$
$X_4$ is Cl, F, H,
in which R' and R'', independently of one another, are hydrogen, $C_{1-4}$-alkyl, which is unsubstituted or substituted in particular by halogen, cyano, $C_{1-4}$-alkoxy, hydroxyl, carboxyl, sulpho or sulphato, benzyl, phenethyl, cyclohexyl, phenyl or -$NHCH_2CH_2OCH_2CH_2$-$SO_2M$ (M=CH=$CH_2$ or —$CH_2CH_2$—V where V is a radical which can be eliminated by alkali); phenyl which is unsubstituted or substituted in particular by halogen, nitro, cyano, trifluoromethyl, sulphamoyl, carbamoyl, $C_{1-4}$-alkyl, $C_{1-4}$-alkanoylamino, benzoylamino, ureido, hydroxyl, carboxyl, sulphomethyl or sulpho, or is naphthyl which is unsubstituted or substituted by halogen, nitro, $C_{1-4}$-alkoxy, $C_{1-4}$-alkanoylamino, hydroxyl, carboxyl or sulpho, or in which R' and R", together with the amino nitrogen atom, form a morpholino, piperidino or piperazino radical.

Dyestuffs containing the abovementioned reactive group systems are known, for example, from the following publications: U.S. Pat. No. 3,377,336, U.S. Pat. No. 3,527,760, British Patent Specification 1,169,254, U.S. Pat. No. 3,669,951, German Patent Specification 1,644,208, British Patent Specification 1,188,606, German Offenlegungsschrift 2,817,780, Spanish Patent Specification 479,771.

The dyestuffs can have one or more identical or different reactive groups.

The dyestuffs are preferably those having metal-containing or metal-free mono- or polyazo, anthraquinone, phthalocyanine, nitro, di- and triphenylmethane, oxazine, dioxazine, thiazine, xanthene or formazan radicals which preferably contain 1-6 sulpho or carboxyl groups.

The dyestuffs are in general present in the form of their alkali metal salts (Li, Na, K) or ammonium salts (NH$_4^\oplus$ or

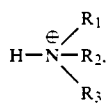

in which the substituents $R_1$-$R_3$, independently of one another, represent $C_1$-$C_4$alkyl or

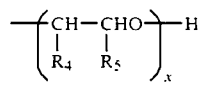

where $R_4$, $R_5$, independently of one another represent H or $CH_3$ and x represents 1-4).

The preparations are highly suitable for the dyeing and printing of hydroxyl- and amido-containing materials, in particular cellulose.

EXAMPLE 1

10 kg of the dyestuff of the formula

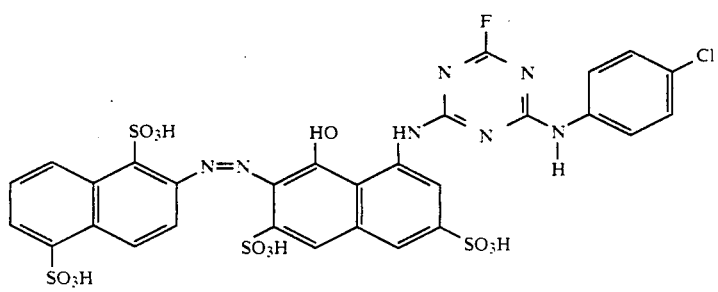

(sodium salt, dry) are mixed with 4.1 kg of a condensation product of naphthalenesulphonic acid with formaldehyde. 100 g of disodium hydrogen phosphate, 50 q of sodium dihydrogen phosphate, 100 g of paraffin oil and 1.3 kg of nicotinic acid are added to the mixture, which is then intimately mixed in a mill. The dyestuff powder thus obtained is highly suitable for the dyeing of textile cotton substrates.

EXAMPLE 2

3.7 kg of sodium sulphate are added to 30kg of a suspension of the dyestuff of the formula

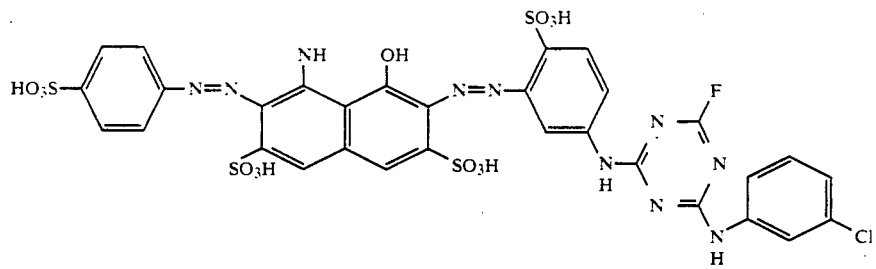

(sodium salt, dyestuff content 25%). Furthermore, 150 g of sodium tripolyphosphate, 100 g.of mineral oil and 1.1 kg of the sodium salt of nicotinic acid are added. The suspension is converted in a spray-drier into 12.6 kg of dyestuff powder having a residual moisture content of 3%. The dyestuff powder is highly suitable for the dyeing of textile cotton substrates.

EXAMPLE 3

600 g of dicyandiamide, 3 kg of ε-caprolactam, 150 g of boric acid and 1.5 kg of nicotinic acid are added to 30 kg of a solution of the dyestuff of the formula

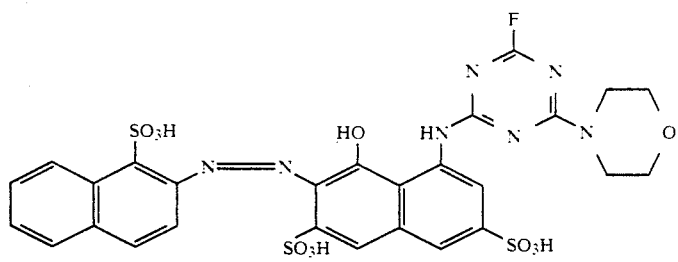

(Li/Na salt; Li/Na ratio about 1:1) having a dyestuff content of 30%. The pH is brought to 7.7 with a small amount of LiOH. 850 g of deionised water are added to bring the mixture to the desired strength, resulting in a dyestuff solution which is highly suitable for all dyeing processes for textile cotton substrates.

Excellent preparations are likewise obtained by replacing in Examples 1-3 the dyestuffs mentioned there by the dyestuffs which follow:

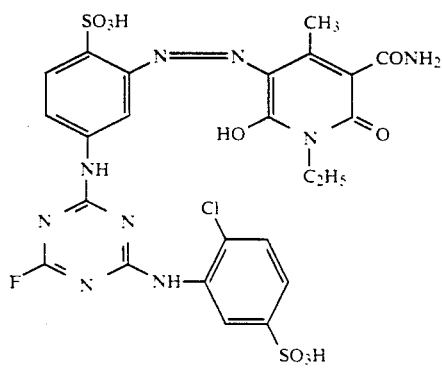

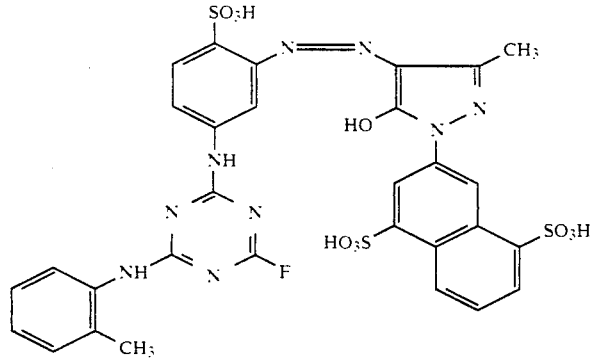

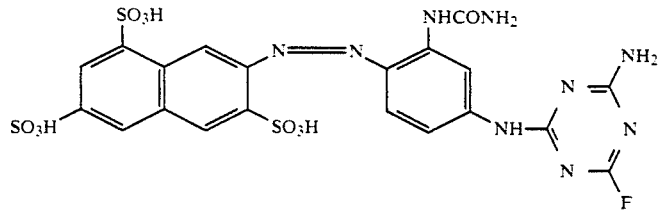

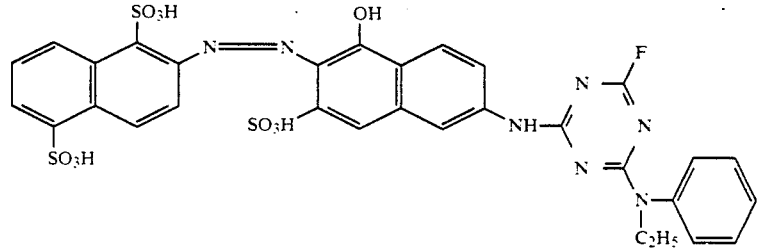

-continued
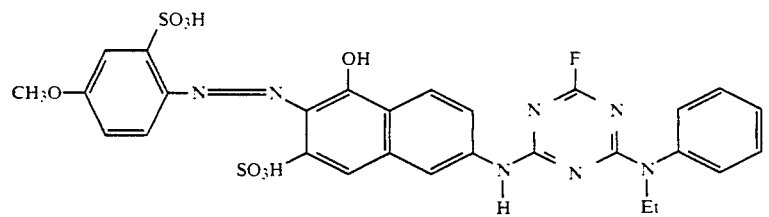
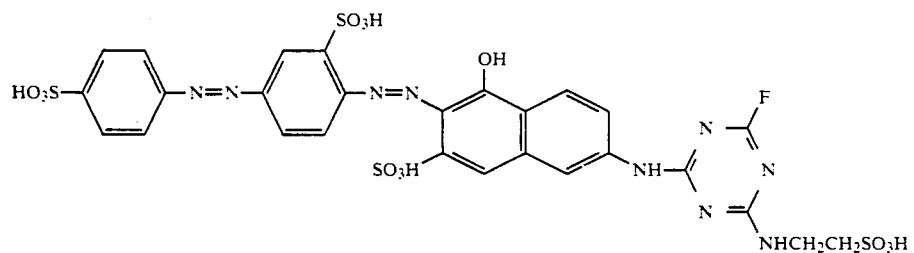
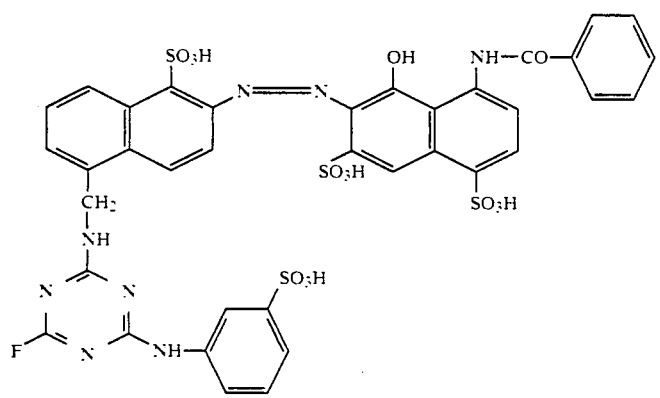
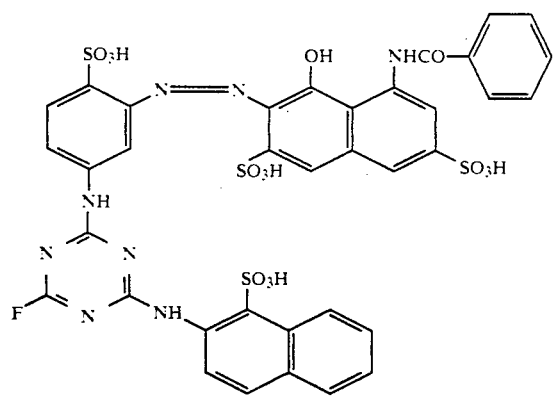
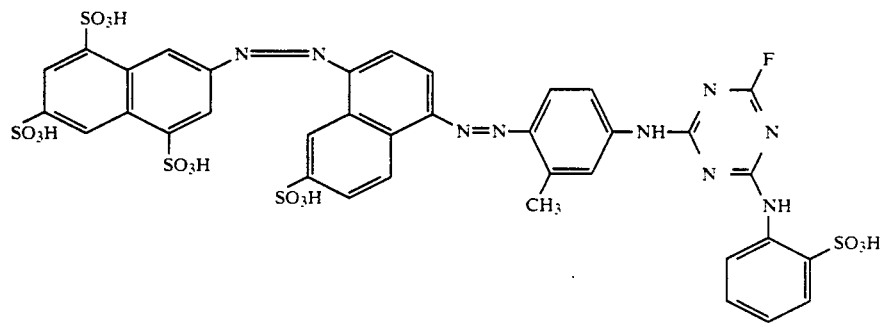

-continued
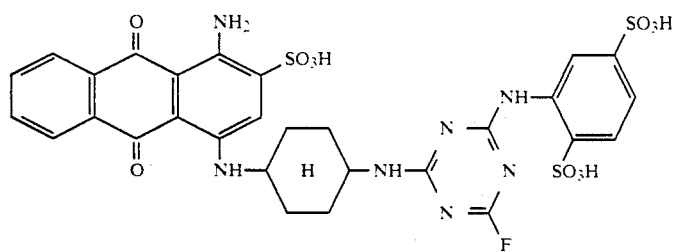
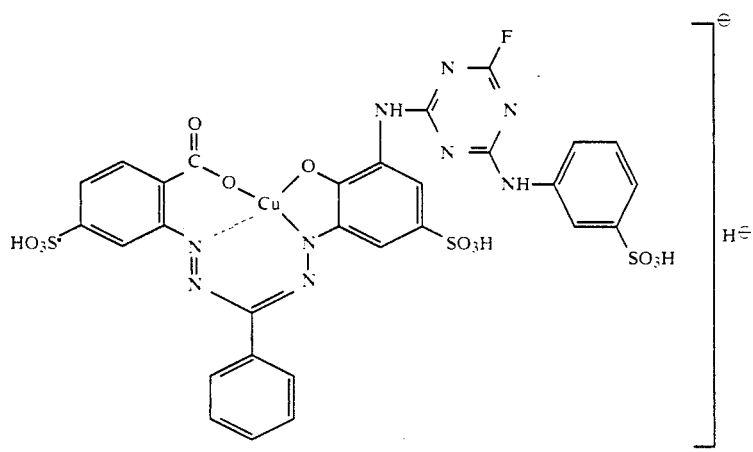
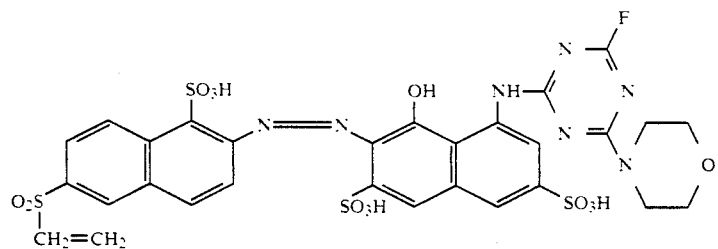
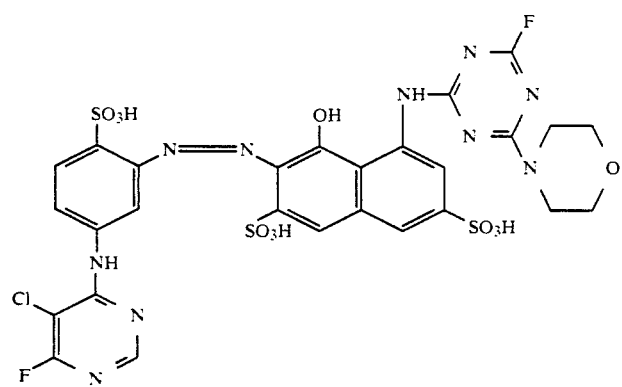

-continued
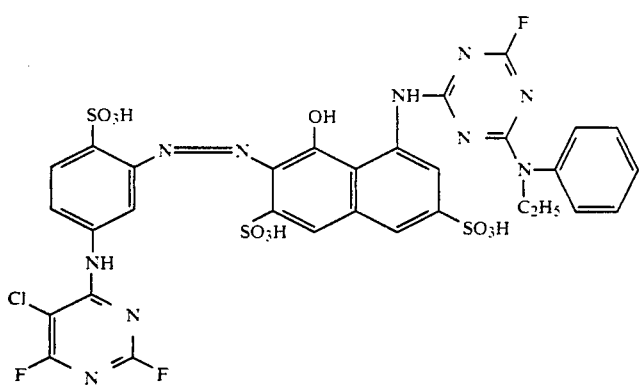
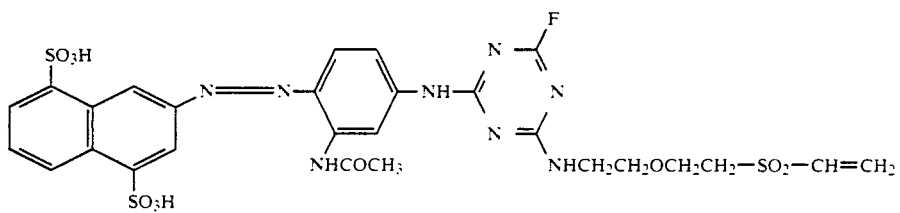
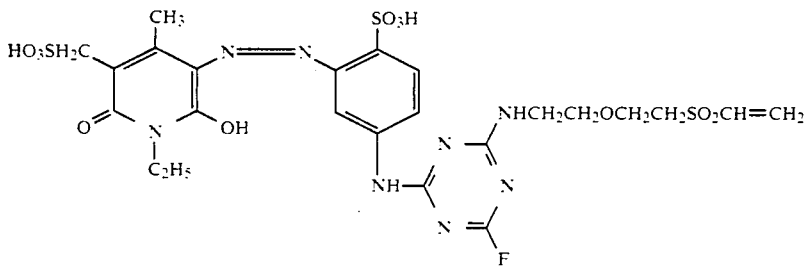
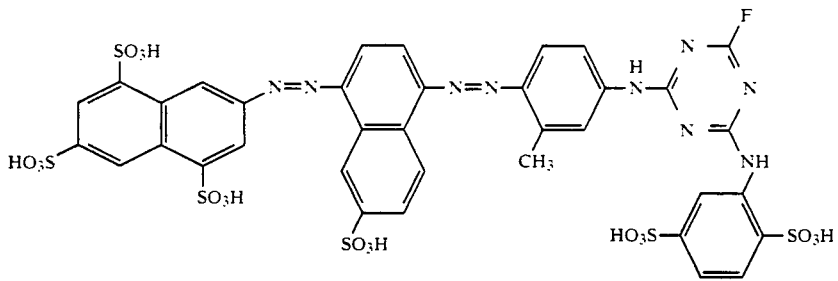
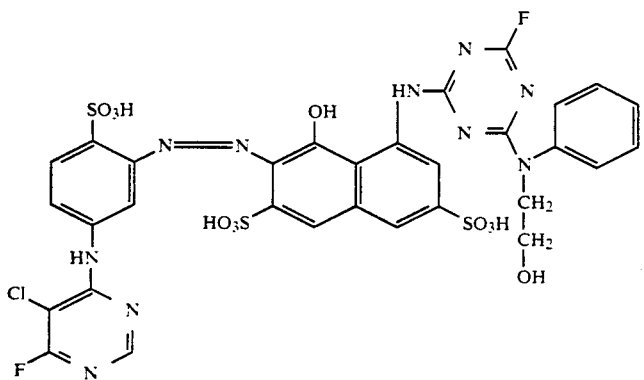

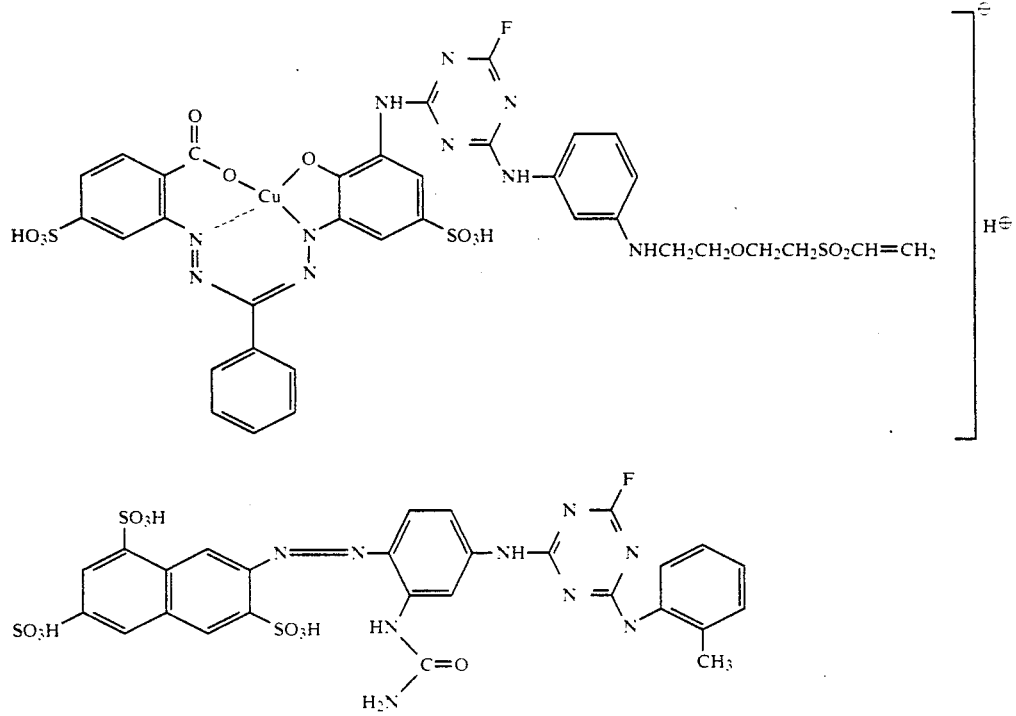

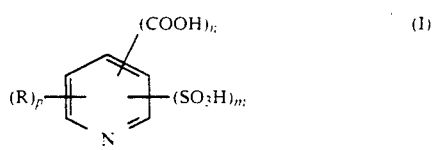

It is also possible to use, instead of the dyestuffs having a group -SO$_2$CH=CH$_2$, the corresponding dyestuffs having the group -SO$_2$CH$_2$CH$_2$OSO$_3$H or -SO$_2$CH$_2$CH$_2$Cl.

We claim:

1. Preparations of water-soluble reactive dyestuffs, characterised in that they contain pyridine derivatives of the formula

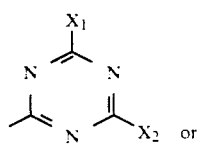

in which n, m are 0, 1 or 2 and n+m is 1-3 p is 0 or 1

R is C$_1$-C$_4$-alkyl or salts thereof.

2. Preparations according to claim 1 containing dyestuffs having at least one mono- or dihalogeno-sym.-triazinyl radical, mono-, di- or trihalogenopyrimidinyl radical or a -SO$_2$CH$_2$CH$_2$X radical where X is an anion radical which can be eliminated.

3. Preparations according to claim 1 containing dyestuffs having at least one reactive radical

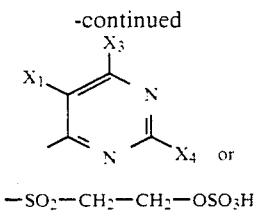

—SO$_2$—CH$_2$—CH$_2$—OSO$_3$H where

X$_1$ is Cl, F

X$_2$ is Cl, F, NH$_2$, NHR', OR', CH$_2$R', SR', NR'R"

X$_3$ is Cl, F, CH$_3$

X$_4$ is H, Cl, F, in which R' and R", independently of one another, denote hydrogen, C$_{1-4}$-alkyl, which is either unsubstituted or substituted by halogen, cyano, C$_{1-4}$-alkoxy, hydroxyl, carboxyl, sulpho or sulphato, benzyl, phenethyl, cyclohexyl, phenyl or -NHCH$_2$CH$_2$OCH$_2$CH$_2$-SO$_2$M (M=CH=CH$_2$ or —CH$_2$CH$_2$—V where V is a radical which can be eliminated by alkali), phenyl which is either unsubstituted or substituted by halogen, nitro, cyano, trifluoromethyl, sulphamoyl, carbamoyl, C$_{1-4}$-alkyl, C$_{1-4}$-alkanoylamino, benzoylamino, ureido, hydroxyl, carboxyl, sulphomethyl or sulpho, or naphthyl which is either unsubstituted or substituted by halogen, nitro, C$_{1-4}$-alkoxy, C$_{1-4}$-alkanoylamino, hydroxyl, carboxyl or sulpho, or in which R' and R", together with the amino nitrogen atom, form a morpholino, piperidino or piperazino radical.

4. Preparations according to claim 3, characterised in that R' and R", independently of one another denote:

hydrogen

C$_{1-4}$-alkyl-substituted by halogen, cyano, C$_{1-4}$-alkoxy, hydroxyl, carboxyl, sulpho or sulphato, benzyl, phenethyl, cyclohexyl, phenyl or -NHCH$_2$CH$_2$OCH$_2$CH$_2$-SO$_2$M (M=CH=CH$_2$ or —CH$_2$CH$_2$—V where V is a radical which can be eliminated by alkali);

phenyl substituted by halogen, nitro, cyano, trifluoromethyl, sulphamoyl, carbamoyl, C$_{1-4}$-alkyl, C$_{1-4}$-alkanoylamino, benzoylamino, ureido, hydroxyl, carboxyl, sulphomethyl or sulpho, or naphthyl substituted by halogen, nitro, C$_{1-4}$-alkoxy, C$_{1-4}$-alkanoylamino, hydroxyl, carboxyl or sulpho.

5. Preparations according to claim 1, characterised in that the pyridine derivative (I) is nicotinic acid, isonicotinic acid, pyridine-3-sulphonic acid, pyridine-2,3-dicarboxylic acid, pyridine-2,5-dicarboxylic acid, 2-carboxy-5-methylpyridine or 4-methylpyridine-3-sulphonic acid.

6. Solid preparations according to claim 1, containing 10-95% by weight of dyestuff
0.01-20% by weight of (I)
0-90% by weight of conventional standardising agents selected from the group consisting of inorganic salts, polyphosphates, and water-soluble organic substances, the water-soluble organic substances being condensation products of naphthalene sulphonic acid with formaldehyde and dextrin.

7. Liquid preparations according to claim 1, containing 5-50% by weight of dyestuff
0.01-20% by weight of (I)
0-90% by weight of water-miscible solvent
0.1-5% by weight of a buffer to adjust the pH of the liquid preparation to about 4 to 8, the buffer being selected from the group consisting of alkali metal phosphates, alkali metal hydrogen phosphate, alkali metal dihydrogen phosphates, and alkali metal borates, or of a dedusting agent selected from the group consisting of oils, phthalic esters and nonionic detergents,
90-20% by weight of water.

8. Process for the dyeing and printing of hydroxyl- or amido-containing materials with dyestuff preparations, characterised in that a preparation according to claim 1 is used.

9. Preparations according to claim 2, wherein X is -Cl or -OSO$_3$H.

10. Preparations according to claim 6, wherein the inorganic salts are selected from the group consisting of NaCl, Na$_2$SO$_4$, and (NH$_4$)$_2$SO$_4$.

11. Process for the dyeing and printing of hydroxyl- or amido-containing materials with dyestuff preparations, characterized in that a preparation according to claim 3 is used.

* * * * *